(12) United States Patent
Xue et al.

(10) Patent No.: US 11,491,073 B2
(45) Date of Patent: Nov. 8, 2022

(54) REHABILITATION TRAINING APPARATUS AND REHABILITATION TRAINING SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Bangcan Xue, Beijing (CN); Yanjun Liu, Beijing (CN); Dong Zhang, Beijing (CN); Zhehua Long, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 925 days.

(21) Appl. No.: 16/279,258

(22) Filed: Feb. 19, 2019

(65) Prior Publication Data

US 2019/0328603 A1 Oct. 31, 2019

(30) Foreign Application Priority Data

Apr. 25, 2018 (CN) .......................... 201810380703.X

(51) Int. Cl.
*A61H 1/02* (2006.01)
*A61H 9/00* (2006.01)
(Continued)

(52) U.S. Cl.
CPC ............. *A61H 1/0281* (2013.01); *A61H 1/00* (2013.01); *A61H 9/0007* (2013.01);
(Continued)

(58) Field of Classification Search
CPC ...... A61H 1/00; A61H 1/0281; A61H 9/0007; A61H 9/0092; A61H 2201/14;
(Continued)

(56) References Cited

U.S. PATENT DOCUMENTS 4,603,689 A * 8/1986 Horner ................. A61H 1/0218
602/32
9,358,683 B2 * 6/2016 Ko ........................... B25J 9/104
(Continued)

FOREIGN PATENT DOCUMENTS

CN 103845182 A 6/2014
CN 104622668 A 5/2015

*Primary Examiner* — Justine R Yu
*Assistant Examiner* — Alexander Morales
(74) *Attorney, Agent, or Firm* — Kinney & Lange, P.A.

(57) ABSTRACT

A rehabilitation training apparatus and a rehabilitation training system are disclosed. The rehabilitation training apparatus includes a powertrain, a pneumatic flexible actuator and a receiving portion. The powertrain is coupled to the pneumatic flexible actuator and configured to rotate upon drive of the pneumatic flexible actuator. The receiving portion is coupled to the powertrain and configured to receive a training portion and be interlocked with rotation of the powertrain.

17 Claims, 10 Drawing Sheets

(51) Int. Cl.
*A61H 1/00* (2006.01)
*B25J 9/00* (2006.01)

(52) U.S. Cl.
CPC .......... *A61H 9/0092* (2013.01); *B25J 9/0006* (2013.01); *A61H 2201/1238* (2013.01); *A61H 2201/14* (2013.01); *A61H 2201/1409* (2013.01); *A61H 2201/1616* (2013.01); *A61H 2201/1633* (2013.01); *A61H 2201/1638* (2013.01); *A61H 2201/1671* (2013.01); *A61H 2201/50* (2013.01); *A61H 2201/5056* (2013.01); *A61H 2203/0431* (2013.01)

(58) Field of Classification Search
CPC .... A61H 2201/1409; A61H 2201/1616; A61H 2201/1633; A61H 2201/1638; A61H 2201/1671; A61H 2201/5007; A61H 2201/5056; A61H 2203/0431; A61H 2205/062; A61H 2201/1238; A61H 2201/1623; A61H 2201/50; B25J 9/0006; A63B 22/0005; A63B 21/4005; A63B 21/4017
USPC .................................................. 601/33; 482/6
See application file for complete search history.

(56) References Cited

U.S. PATENT DOCUMENTS

| | | | |
|---|---|---|---|
| 10,231,851 B2* | 3/2019 | Maddry | A61H 1/0266 |
| 11,225,984 B2* | 1/2022 | Noda | F15B 15/20 |
| 2003/0223844 A1* | 12/2003 | Schiele | A63B 21/00178 |
| | | | 414/5 |
| 2006/0161220 A1* | 7/2006 | Kobayashi | A61H 1/0277 |
| | | | 607/49 |
| 2006/0249017 A1* | 11/2006 | Hiramatsu | A61H 1/0237 |
| | | | 92/89 |
| 2007/0118252 A1* | 5/2007 | Okazaki | F15B 9/09 |
| | | | 700/254 |
| 2010/0145238 A1* | 6/2010 | Stienen | A63B 21/4011 |
| | | | 601/33 |
| 2012/0017718 A1* | 1/2012 | Greenhill | A61H 1/0237 |
| | | | 92/89 |
| 2016/0000633 A1* | 1/2016 | An | A61H 1/0277 |
| | | | 601/33 |
| 2017/0231787 A1* | 8/2017 | Noda | F16C 1/12 |
| | | | 623/26 |
| 2017/0296418 A1* | 10/2017 | Lee | A61H 1/0277 |
| 2018/0036194 A1* | 2/2018 | Matthew | A61H 3/00 |

* cited by examiner

REHABILITATION TRAINING APPARATUS AND REHABILITATION TRAINING SYSTEM

CROSS-REFERENCE TO RELATED APPLICATION

This application claims the benefit of Chinese Patent Application No. 201810380703.X, filed on Apr. 25, 2018, the disclosure of which is incorporated herein in its entirety by reference.

TECHNICAL FIELD

The present disclosure relates to the field of medical devices, and in particular to a rehabilitation training apparatus and a rehabilitation training system.

BACKGROUND

In modern life and work, diseases of muscles, joints and soft tissues, such as but not limited to spinal skew, cervical spondylosis, frozen shoulder, etc., are becoming more and more common.

SUMMARY

Embodiments of the present disclosure provide a rehabilitation training apparatus, including at least one rehabilitation training component, wherein the rehabilitation training component includes: a pneumatic flexible actuator; a powertrain, coupled to the pneumatic flexible actuator, and configured to rotate upon drive of the pneumatic flexible actuator; a receiving portion, coupled to the powertrain, and configured to receive a training portion and be interlocked with rotation of the powertrain.

According to an embodiment of the present disclosure, the pneumatic flexible actuator includes a pneumatic muscle, configured to provide a stroke required for training of the training portion.

According to an embodiment of the present disclosure, the pneumatic flexible actuator includes a first pneumatic muscle pair; the powertrain includes a first sub-rotation; wherein the first sub-rotation includes a first bracket, a first transmission shaft, a first conversion component, and a second bracket; wherein the first bracket is configured to rotatably support the first transmission shaft; the first conversion component comprises a first rotating component and is configured to convert an antagonistic motion of the first pneumatic muscle pair into rotation of the first rotating component; the first rotating component and the second bracket are mounted on the first transmission shaft; the receiving portion is coupled to the second bracket and is configured to be interlocked with rotation of the second bracket.

According to an embodiment of the present disclosure, the pneumatic flexible actuator includes a second pneumatic muscle pair and a third pneumatic muscle pair; the powertrain includes a second sub-rotation and a third sub-rotation; wherein the second sub-rotation includes a second bracket, a second transmission shaft, a second conversion component, and a third bracket; wherein the second bracket is configured to rotatably support the second transmission shaft; the second conversion component comprises a second rotating component and is configured to convert an antagonistic motion of the second pneumatic muscle pair into rotation of the second rotating component; the second rotating component and the third bracket are mounted on the second transmission shaft, so that the third bracket rotates with rotation of the second rotating component; wherein the third sub-rotation includes a third bracket, a third transmission shaft, a third conversion component, a first connecting plate, and a second connecting plate; wherein the third bracket is configured to rotatably support the third transmission shaft; the third conversion component includes a third rotating component and is configured to convert an antagonistic motion of the third pneumatic muscle pair into rotation of the third rotating component; the third rotating component is assembled on the third transmission shaft; the first connecting plate and the second connecting plate are respectively positioned on two sides of the third rotating component and fixed on the third rotating component so as to be interlocked with rotation of the third rotating component; the receiving portion is fixed on the first connecting plate and the second connecting plate.

According to an embodiment of the present disclosure, the first transmission shaft, the second transmission shaft, and the third transmission shaft are disposed orthogonally to each other.

According to an embodiment of the present disclosure, at least one of the first sub-rotation and the second sub-rotation further includes a stop component, configured between a rotating component of at least one of the first sub-rotation and the second sub-rotation and a corresponding bracket to prevent a corresponding rotating component from moving in an axial direction to a corresponding bracket.

According to an embodiment of the present disclosure, a stepped portion is configured on at least one of the first transmission shaft and the second transmission shaft, wherein the stepped portion is configured to receive a corresponding rotating component on a corresponding transmission shaft.

According to an embodiment of the present disclosure, a boss is configured at an end of the third transmission shaft adjacent to the third bracket to couple the third bracket; and a third stop component is configured between the second bracket and the third bracket to position the third bracket.

According to an embodiment of the present disclosure, a fourth stop component is configured between the first connecting plate and the third bracket, and a fifth stop component is configured between the second connecting plate and the third bracket to prevent axial movement of the third rotating component on the third transmission shaft.

According to an embodiment of the present disclosure, the third sub-rotation further includes a flexible guiding component; wherein the flexible guiding component is fixed to the third bracket and configured to guide a coupling direction of the third pneumatic muscle pair and the third rotating component to cancel disturbance caused by rotation of the second sub-rotation to rotation of the third sub-rotation.

According to an embodiment of the present disclosure, the flexible guiding component includes a flexible cannula holder, a first flexible sleeve, and a second flexible sleeve; wherein the flexible cannula holder is fixedly spaced to the third bracket at a predetermined interval, the first flexible sleeve and the second flexible sleeve are positioned between the flexible cannula holder and the third bracket.

Embodiments of the present disclosure provide a rehabilitation training apparatus, including two rehabilitation training components described above and a fuselage, wherein the two rehabilitation training components are symmetrically disposed on both sides of the fuselage.

According to an embodiment of the present disclosure, the fuselage includes a seat and a backrest.

According to an embodiment of the present disclosure, the first pneumatic muscle pair of each of the two rehabilitation training components is positioned within the backrest.

Embodiments of the present disclosure provide a rehabilitation training system, including: a rehabilitation training apparatus described above; a controller, configured to output a control command; a driving circuit, configured to receive the control command from the controller; a gas source, fluidly connected to the rehabilitation training apparatus or a pneumatic flexible actuator of the rehabilitation training apparatus through an electromagnetic valve group; and the electromagnetic valve group, configured to inflate and deflate the rehabilitation training apparatus or the pneumatic flexible actuator of the rehabilitation training apparatus under control of the driving circuit.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

In the drawings, which are not necessarily to scale, the same reference numeral may describe similar components in different views. The drawings illustrate various embodiments by way of example and not limitation, and describe the disclosed embodiments together with the description and claims. Wherever possible, the same reference numeral describes the same or similar components in all drawings. Such an embodiment is illustrative and is not intended to be an exhaustive or exclusive embodiment of the apparatus or method.

Figure 1:
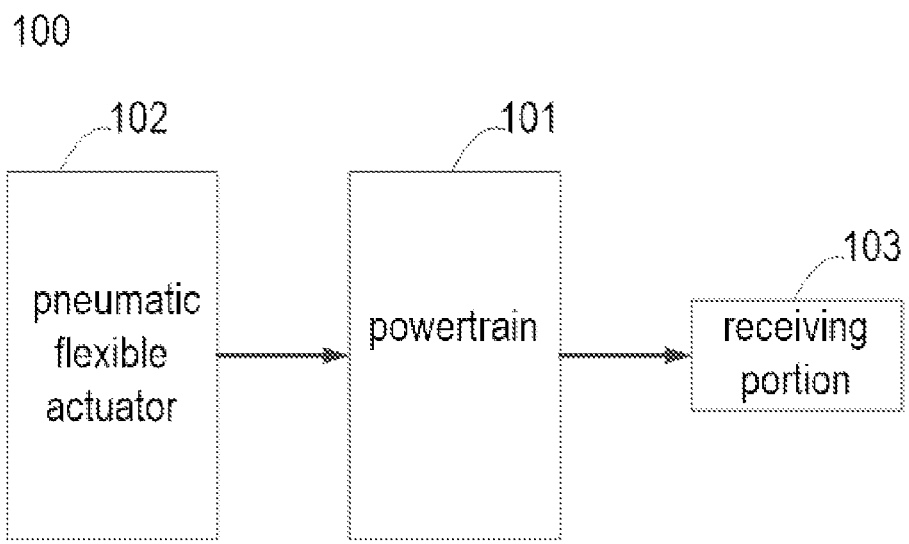
FIG. 1 exemplarily illustrates a structural block diagram of a rehabilitation training apparatus according to an embodiment of the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Various aspects and features of the present disclosure are described herein with reference to the drawings. These and other features of the present disclosure will become apparent from the following description of embodiments with reference to the drawings.

The present disclosure may use phrases "in an embodiment", "in another embodiment", "in still another embodiment" or "in other embodiments", which may refer to one or more of the same or different embodiments in accordance with the present disclosure. It should be noted that in the entire specification, the same reference numeral refers to the same or similar elements, and unnecessary repeated description is omitted. In addition, in specific embodiments, an element that appears in a singular form may appear in a multiple (plural) form.

"Components A and B are coupled" used in the present disclosure may include either "A and B are directly coupled" or "A and B are indirectly coupled through one or more other components".

FIG. 1 exemplarily illustrates a structural block diagram of a rehabilitation training apparatus 100 according to an embodiment of the present disclosure. The rehabilitation training apparatus 100 includes at least one rehabilitation training component. The rehabilitation training component includes a powertrain 101, a pneumatic flexible actuator 102, and a receiving portion 103. The powertrain 101 is coupled to the pneumatic flexible actuator 102, and the powertrain 101 may rotate upon drive (such as, but not limited to, linear drive) of the pneumatic flexible actuator 102. The receiving portion 103 receives a training portion. The receiving portion 103 is coupled to the powertrain 101, and configured to be interlocked with the rotation of the powertrain 101.

The pneumatic flexible actuator 102 is configured in the rehabilitation training apparatus 100, the powertrain 101 rotates upon the drive of the pneumatic flexible actuator 102, and the receiving portion 103 is interlocked with the powertrain 101 to drive the training portion received by the receiving portion 103 to perform corresponding rehabilitation training, such as movement of muscles, joints, and soft tissues in various directions, e.g., forward/backward flexion, abduction/adduction, internal/external rotation of the shoulder, and head down, head up, flat turn, left side deflection, right side deflection of the neck, and so on.

In an embodiment, the pneumatic flexible actuator 102 may be a pneumatic muscle. The pneumatic muscle may provide a stroke required for training of the training portion. For example, an appropriate driving stroke may be configured for the pneumatic muscle by at least one of the control of the inflating and deflating of the pneumatic muscle and the design of the contraction rate. As such, the danger caused by over-stroke may be avoided, and insufficient training caused by insufficient stroke may also be avoided.

Figure 12:
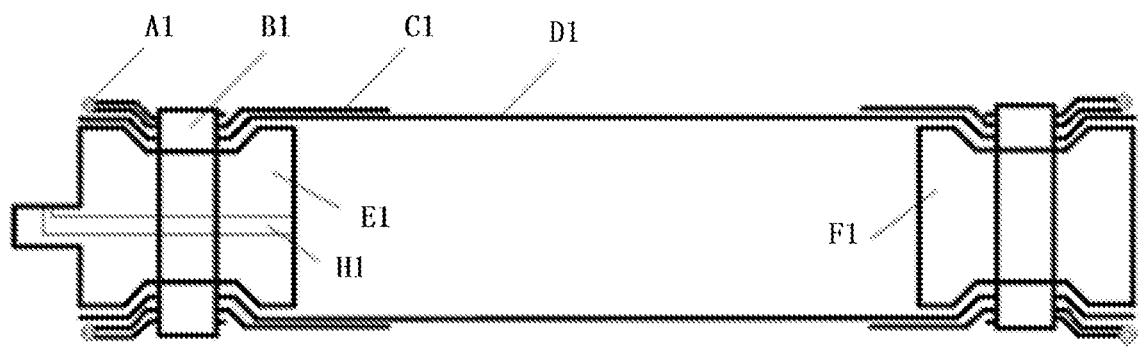
FIG. 12 is a schematic illustration of an exemplary structure of a pneumatic muscle as an example of a pneumatic flexible actuator.

An embodiment of the pneumatic muscle is described in detail below. As shown in FIG. 12, the pneumatic muscle includes: A1 copper wire, B1 clamp, C1 woven mesh, D1 rubber tube, E1 inflatable end plug, F1 tail plug, and H1 vent.

The main body of the pneumatic muscle is the rubber tube D1. The woven mesh C1 of PET material is placed on the outer side of the rubber tube. Two ends of the rubber tube D1 are respectively placed on plugs at ends. There is not a vent on the plug F1 of the rubber tube D1, which completely blocks the rubber tube to prevent air leakage. There is a vent in the inside of the plug E1, which inflates and deflates the inside of the pneumatic muscle. The rubber tube D1 and the woven mesh C1 are wrapped 2-3 turns with a black tape at concave portions of the plugs E1 and F1, so that the rubber tube and the woven mesh are firmly bonded together at the concave portions of the plugs. A coil of copper wire A1 is wrapped respectively at an outer edge of the concave portion of the plug at both ends to prevent the woven mesh C1 from being tripped under high pressure. In the embodiment shown in FIG. 12, the woven mesh C1 may be folded into a layered structure. The copper wire is arranged at the bend of the end of the woven mesh C1. The woven mesh extends to a position of the tail of the plug. The clamp B1 is tightly clamped to the concave portions of the plugs E1 and F1, thereby preventing the pneumatic muscle from leaking, and on the other hand preventing the pneumatic muscle from being broken when the internal of the pneumatic muscle is in a high pressure state. The design of the plugs E1 and F1 is very flexible, and different connection forms may be designed according to connection modes.

The rubber tube D1 has certain toughness and elasticity, may expand and contract under an inflation state and a deflation state, and has good fatigue resistance. The woven mesh C1 has good non-ductility, strength and toughness, but does not stretch and deform. The material of the plugs E1 and F1 may be a hard non-metallic material with high density, or a metal material with high strength and low density. The clamp B1 may be a stainless steel clamp or an aluminum alloy clamp with high strength.

In the process of inflating the interior, the pneumatic muscle may expand radially and contract axially, and use the axial driving force generated by the axial contraction to drive an external load. Moreover, as the internal pressure increases, the stiffness of the pneumatic muscle increases. And, as the internal pressure decreases, the stiffness of the pneumatic muscle decreases. According to the characteristics of the pneumatic muscle, the pneumatic muscle may be used as a new linear actuator. Compared with traditional actuators such as a hydraulic cylinder, a pneumatic cylinder, and a motor, the weight of the pneumatic muscle is very light. In addition, the length of the pneumatic muscle may be designed according to the requirements of the driving stroke combined with the contraction rate of the pneumatic muscle. As such, the danger caused by the over-stroke may be avoided.

In another embodiment, the pneumatic flexible actuator 102 may be other forms than the pneumatic muscle described in the above embodiments, such as a Flexible Fluidic Actuator, which utilizes an airbag and two splints to form a joint actuator. The two splints form a hinge. When compressed gas (or liquid) is filled, the airbag expands and bulges, and pushes the splints on both sides to a certain angle to implement a driving action of the joint.

Those skilled in the art can understand that any type of the pneumatic flexible actuator may be utilized to construct the rehabilitation training apparatus of the present disclosure as long as the pneumatic flexible actuator 102 provides the stroke required for training with the training portion.

Figure 2:
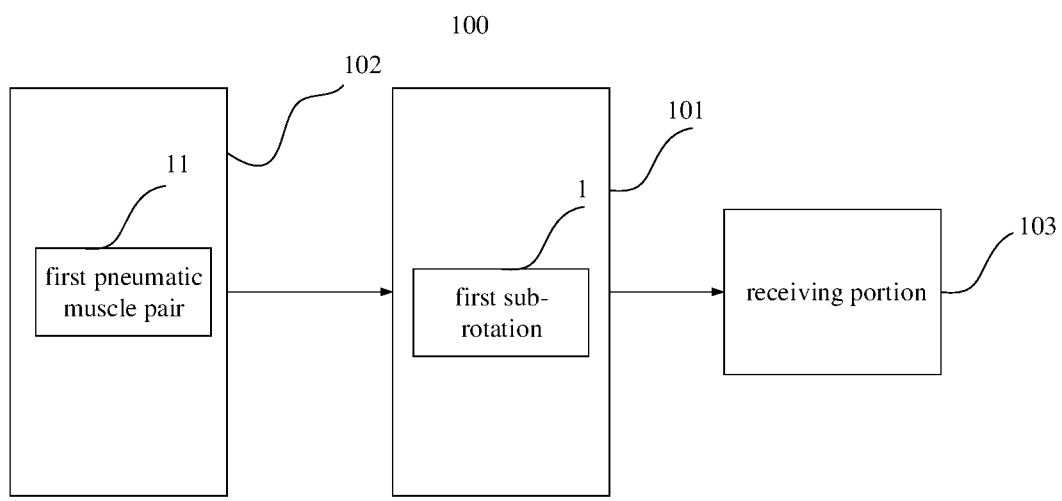
FIG. 2 exemplarily illustrates a structural block diagram of a rehabilitation training apparatus according to another embodiment of the present disclosure.

In an embodiment, a single-degree-of-freedom training may be implemented when the pneumatic flexible actuator 102 is implemented using the pneumatic muscle. As shown in FIG. 2, a rehabilitation training apparatus 100 in accordance with another embodiment of the present disclosure includes at least one rehabilitation training component. The rehabilitation training component includes a first pneumatic muscle pair 11 as an example of the pneumatic flexible actuator 102, a first sub-rotation 1 as an example of the powertrain 101, and the receiving portion 103.

Figure 8:
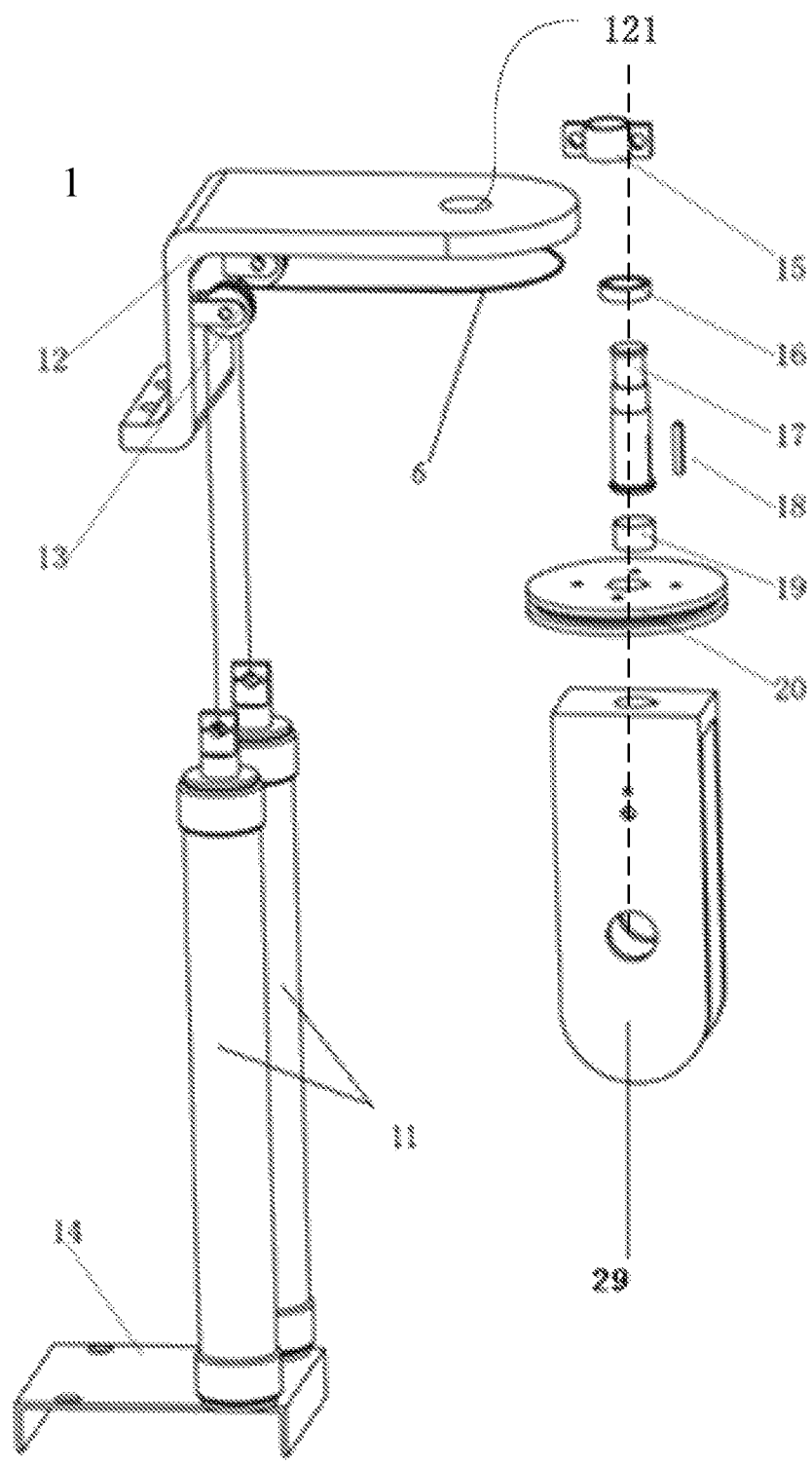
FIG. 8 is a schematic exploded view of a first sub-rotation of a rehabilitation training apparatus according to an embodiment of the present disclosure.

As illustrated in FIG. 8, the first sub-rotation 1 may include: a first bracket 12, a first transmission shaft 17, a first conversion component (such as a first transmission wheel 20 and a traction line 6 shown in FIG. 8. The first conversion component may also take other forms, such as being formed by a gear and a rack) and a second bracket 29. The first bracket 12 may rotatably supports the first transmission shaft 17. The first conversion component includes the first rotating component 20 (which, for example, may be various forms such as a transmission wheel, a gear, and the like). The first conversion component may converts an antagonistic motion of the first pneumatic muscle pair 11 into the rotation of the first rotating component 20. Both of the first rotating component 20 and the second bracket 29 are mounted on the first transmission shaft 17. The receiving portion 103 is coupled (e.g., connected) to the second bracket 29, thereby being interlocked with the rotation of the second bracket 29. FIG. 8 illustrates an implementation of the above-described structure of the first sub-rotation 1. It should be noted that the above-described structure of the first sub-rotation 1 does not depend on all the details shown in FIG. 8, but may be implemented by other embodiments. It should be noted that the antagonistic motion of the pneumatic muscle pair refers to a coordination movement of the pair of the pneumatic muscles in which one of the pneumatic muscles is pressurized and inflated to axially contract and the other pneumatic muscle is depressurized and deflated to axially elongate.

The second bracket 29 is coaxially coupled to the first rotating component 20, and configured to rotate with the rotation of the first rotating component 20. The receiving portion 103 is coupled with the second bracket 29 and interlocked with the rotation of the second bracket 29. As such, a single-degree-of-freedom rehabilitation training apparatus is achieved through a single-degree-of-freedom powertrain structure.

Specific implementation of the first conversion component may be various. For example, the first conversion component is composed of the traction line 6 and the first transmission wheel 20 shown in FIG. 8, in which the traction line 6 is wrapped around the first transmission wheel 20, and each of two ends of the traction line 6 is connected to a pneumatic muscle in the first pneumatic muscle pair 11. As an exemplary operation on the pneumatic muscle, each of the pneumatic muscles may first be pre-inflated such that the traction line 6 of the first sub-rotation (illustrated as 101 in FIG. 2 and illustrated as 1 in FIG. 5) is pre-tightened at an initial position. For a pair of pneumatic muscles forming an antagonistic (pulling-against) mechanism, in a pre-inflated state, one side is pressurized and inflated, and the other side is decompressed and deflated, and the traction line drives the transmission wheel to move. It can be understood that it is not necessary to define a specific step of the pneumatic muscle pair to form the antagonistic structure, as long as the inflating and deflating of the two pneumatic muscles enables the two pneumatic muscles to form the pulling-against (antagonize) mechanism. In other words, the two pneumatic muscles pull each other. Then, the traction line is driven by the inconsistency of the tension between the two pneumatic muscles, thereby driving the transmission wheel to rotate.

As another implementation of the first conversion component, the first conversion component may be composed of a gear and a rack. The gear is used as the first rotating component 20. The rack is wound on the gear. Two ends of the rack are respectively connected to a pneumatic muscle in the first pneumatic muscle pair. In the same or similar manner as described above, a pair of pneumatic muscles with the antagonistic (pulling-against) mechanism is formed. The rack-driven gear is rotated by the inflating and deflating operation of each of the pneumatic muscles. It can be understood that it is not necessary to define a specific step of the pneumatic muscle pair to form the antagonistic structure, as long as the inflating and deflating of the two pneumatic muscles enables the two pneumatic muscles to form the pulling-against (antagonize) mechanism. In other words, the two pneumatic muscles pull each other. Then, the rack motion is driven by the inconsistency of the tension between the two pneumatic muscles, thereby driving the gear to rotate.

Figure 3:
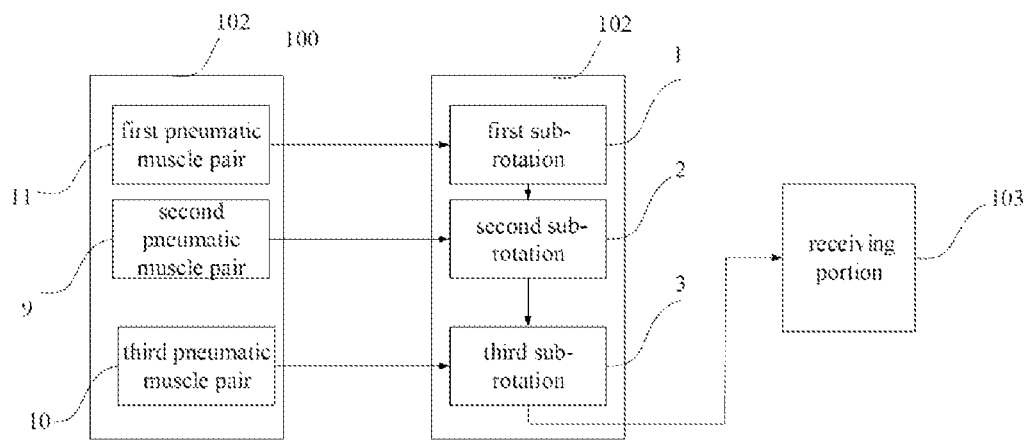
FIG. 3 exemplarily illustrates a structural block diagram of a three-degree-of-freedom rehabilitation training apparatus according to still another embodiment of the present disclosure.
Figure 9:
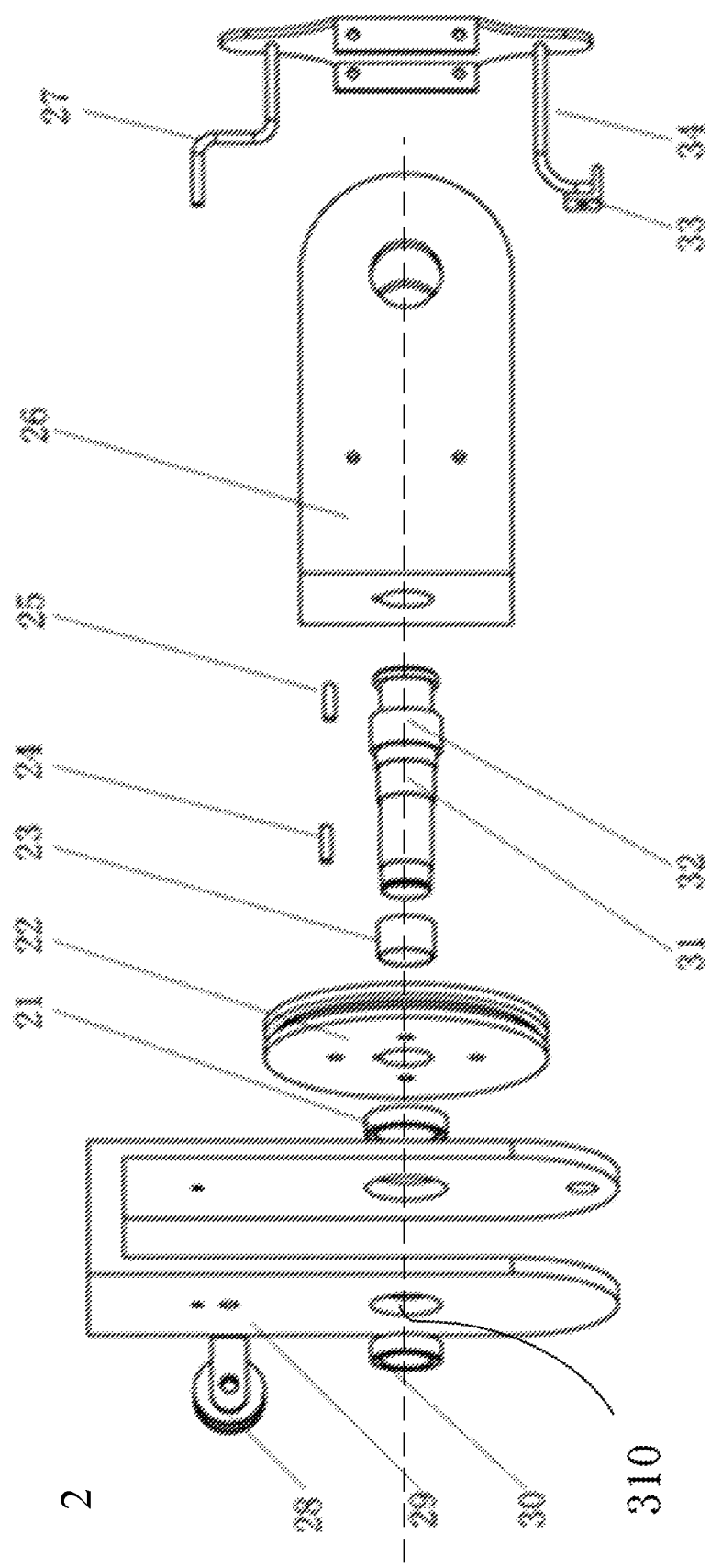
FIG. 9 is a schematic exploded view of a second sub-rotation of a rehabilitation training apparatus according to an embodiment of the present disclosure.

In an embodiment, a rehabilitation training apparatus implementing a three-degree-of-freedom training is also provided. FIG. 3 exemplarily illustrates a structural block diagram of the rehabilitation training apparatus 100 implementing the three-degree-of-freedom training according to still another embodiment of the present disclosure. The pneumatic flexible actuator 102 includes a second pneumatic muscle pair 9 and a third pneumatic muscle pair 10 in addition to the first pneumatic muscle pair 11 that implements a single degree of freedom in the above embodiment. The powertrain 101 includes a second sub-rotation 2 and a third sub-rotation 3 in addition to the first sub-rotation 1. The structure of the first pneumatic muscle pair 11 and the first sub-rotation 1 is the same as that described above, which is not repeated here. The added components are described. As illustrated in FIG. 9, the second sub-rotation 2 may include a second bracket 29, a second transmission shaft 31, a second conversion component, and a third bracket 26. The second bracket 29 rotatably supports the second transmission shaft 31. The second conversion component is similar to the structure of the first conversion component, and is not described herein. The second conversion component may include a second rotating component 22 and configured to convert the antagonistic motion of the second pneumatic muscle pair 9 into the rotation of the second rotating component 22. Both of the second rotating component 22 and the third bracket 26 are mounted on the second transmission shaft 31. The third bracket 26 is coupled to the second rotating component 22 and configured to rotate with the rotation of the second rotating component 22. FIG. 9 shows an implementation of the above-described structure of the second sub-rotation 2. It should be noted that the second sub-rotation 2 does not need to have all the details shown in FIG. 9, but may be implemented as other examples.

Figure 10:
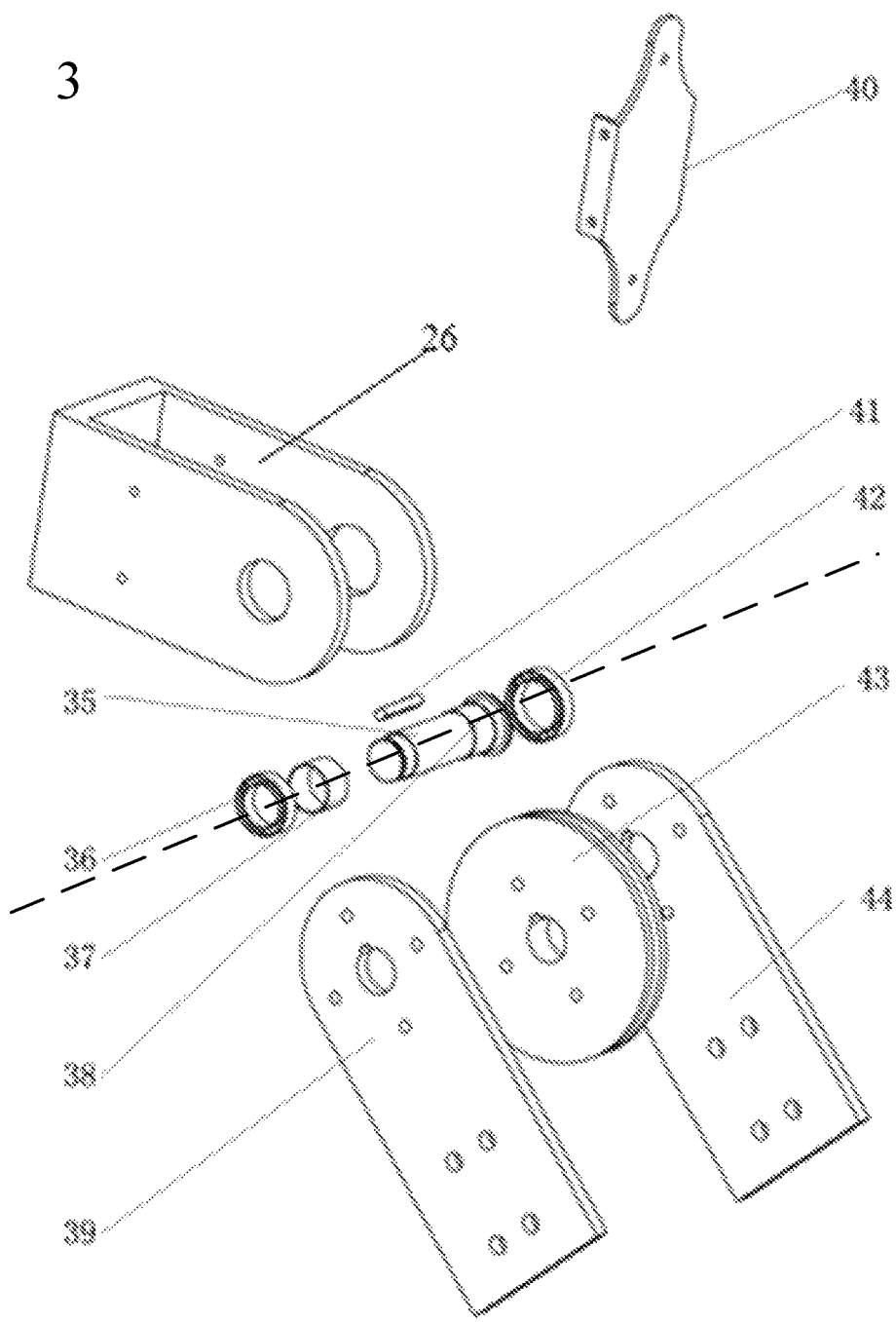
FIG. 10 is a schematic exploded view of a third sub-rotation of a rehabilitation training apparatus according to an embodiment of the present disclosure.

In addition, as illustrated in FIG. 10, the third sub-rotation 3 includes: a third bracket 26, a third transmission shaft 35, a third conversion component, a first connecting plate 39, and a second connecting plate 44. The third bracket 26 rotatably supports the third transmission shaft 35. The third conversion component includes a third rotating component 43 and is configured to convert the antagonistic motion of the third pneumatic muscle pair 10 into the rotation of the third rotating component 43. The third rotating component 43 is assembled on the third transmission shaft 35. The first connecting plate 39 and the second connecting plate 44 are respectively positioned on two sides of the third rotating component 43 and fixed on the third rotating component 43 so as to be interlocked with the rotation of the third rotating component 43. The receiving portion 103 is fixed on the first connecting plate 39 and the second connecting plate 44.

Thus, two degrees of freedom is added to the rehabilitation training apparatus with only one degree of freedom to realize a rehabilitation training apparatus with a three-degree-of-freedom powertrain. By positioning and fixing the first connecting plate 39 and the second connecting plate 44 on both sides of the third rotating component, the receiving portion 103 may be more stably fixed. For example, the receiving portion 103 is erected on the two connecting plates 39 and 44, or sandwiched between the two connecting plates 39 and 44, thereby reducing chattering and shaking during training. By multiplexing of components between adjacent sub-rotations, e.g., multiplexing of the second bracket 29 between the first sub-rotation 1 and the second sub-rotation 2, multiplexing of the third brackets 26 between the second sub-rotation 2 and the third sub-rotation 3, degrees of freedom may be superimposed, and the configuration of the powertrain and a fixed relationship of the receiving portion 103 with the powertrain may be simplified. For example, in the above embodiment, the receiving portion 103 is fixed with the first connecting plate 39 and the second connecting plate 44 in the third sub-rotation 3, without directly fixing with the first sub-rotation 1 and the second sub-rotation 2.

Figure 4:
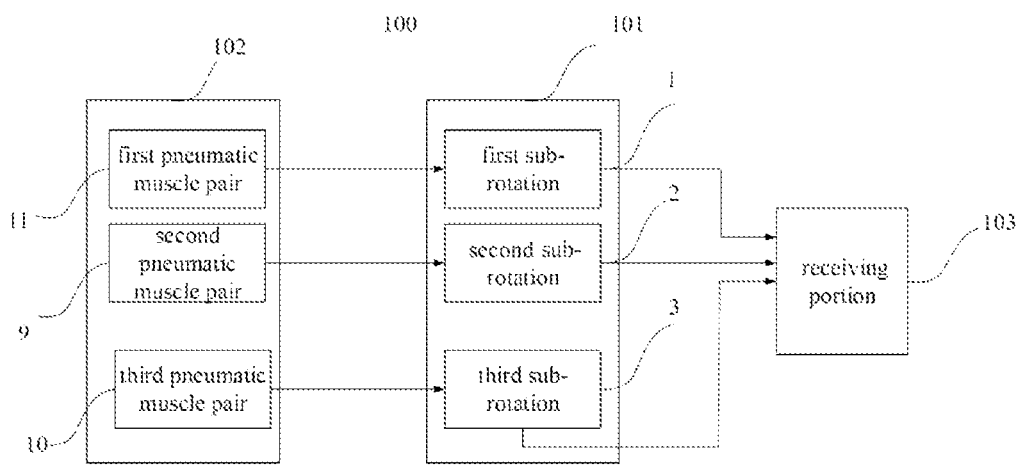
FIG. 4 exemplarily illustrates a structural block diagram of a modification of the three-degree-of-freedom rehabilitation training apparatus of the embodiment shown in FIG. 3.

FIG. 4 exemplarily illustrates a structural block diagram of the rehabilitation training apparatus 100 implementing a three-degree-of-freedom training according to an embodiment of the present disclosure. As shown in FIG. 4, which is the same as the embodiment illustrated in FIG. 3, the rehabilitation training apparatus 100 includes at least one rehabilitation training component. In the rehabilitation training component, the powertrain 101 includes the first sub-rotation 1, the second sub-rotation 2, and the third sub-rotation 3. However, the first sub-rotation 1, the second sub-rotation 2, and the third sub-rotation 3 are relatively independent of each other and respectively act on the receiving portion 103.

It can be understood that the rehabilitation training component may also be considered as a rehabilitation training apparatus.

The first sub-rotation 1 illustrated in FIG. 8 and described above includes the first bracket 12, the first transmission shaft 17, the first conversion component (the traction line 6 and the transmission wheel 20) and the second bracket 29. The first bracket 12 may rotatably supports the first transmission shaft 17. The first conversion component includes the first rotating component—the transmission wheel 20, and converts an antagonistic motion of the first pneumatic muscle pair 11 into the rotation of the first rotating component 20. Both of the first rotating component 20 and the second bracket 29 are mounted on the first transmission shaft 17. The receiving portion 103 (as shown in FIG. 4) is coupled to the second bracket 29, thereby being interlocked with the rotation of the second bracket 29.

Specific implementation of the first sub-rotation 1 may refer to the previous embodiments. The second sub-rotation 2 and the third sub-rotation 3 have the same or similar structure as the first sub-rotation 1.

For example, as shown in FIG. 9, the second sub-rotation 2 independent of the first sub-rotation 1 may include the second bracket 29, the second transmission shaft 31, the second conversion component (e.g., the transmission wheel 22 and the traction line), and the third bracket 26. The second bracket 29 rotatably supports the second transmission shaft 31. The second conversion component may include the second rotating component 22 and configured to convert the antagonistic motion of the second pneumatic muscle pair 9 into the rotation of the second rotating component 22. Both of the second rotating component 22 and the third bracket 26 are mounted on the second transmission shaft 31. The receiving portion 103 is coupled to the third bracket 26 and configured to be interlocked with the rotation of the third bracket 26.

Similarly, the third sub-rotation 3 independent of the first sub-rotation 1, for example as shown in FIG. 10, may include the third bracket 26, the third transmission shaft 35, the third conversion component (e.g., the transmission wheel 43 and the traction line), and a fourth bracket (e.g., the first connecting plate 39 and the second connecting plate 44 shown in FIG. 10, but the structure of the fourth bracket is not limited thereto). The third bracket 26 rotatably supports the third transmission shaft 35. The third conversion component includes the third rotating component 43 and is configured to convert the antagonistic motion of the third pneumatic muscle pair 10 into the rotation of the third rotating component 43. The third rotating component 43 and the fourth brackets 39 and 44 are assembled on the third transmission shaft 35. The receiving portion 103 is coupled to the fourth brackets 39 and 44, and configured to be interlocked with the rotation of the fourth brackets 39 and 44.

As such, the rehabilitation training apparatus with the three-degree-of-freedom powertrain is achieved by the first sub-rotation 1, the second sub-rotation 2, and the third sub-rotation 3, which respectively and independently act on the receiving portion 103. Such a structure may better avoid interference between different degrees of freedom, but the configuration of the powertrain and the fixed relationship of the receiving portion 103 with the powertrain are relatively complicated.

In some embodiments, the first transmission shaft 17, the second transmission shaft 31, and the third transmission shaft 35 are disposed orthogonally to each other, so as to provide a rehabilitation training apparatus with three degrees of freedom orthogonal to each other.

In embodiments described below, a rehabilitation training apparatus according to various embodiments of the present disclosure will be described by taking a rehabilitation training apparatus suitable for a human shoulder as an example.

Figure 5:
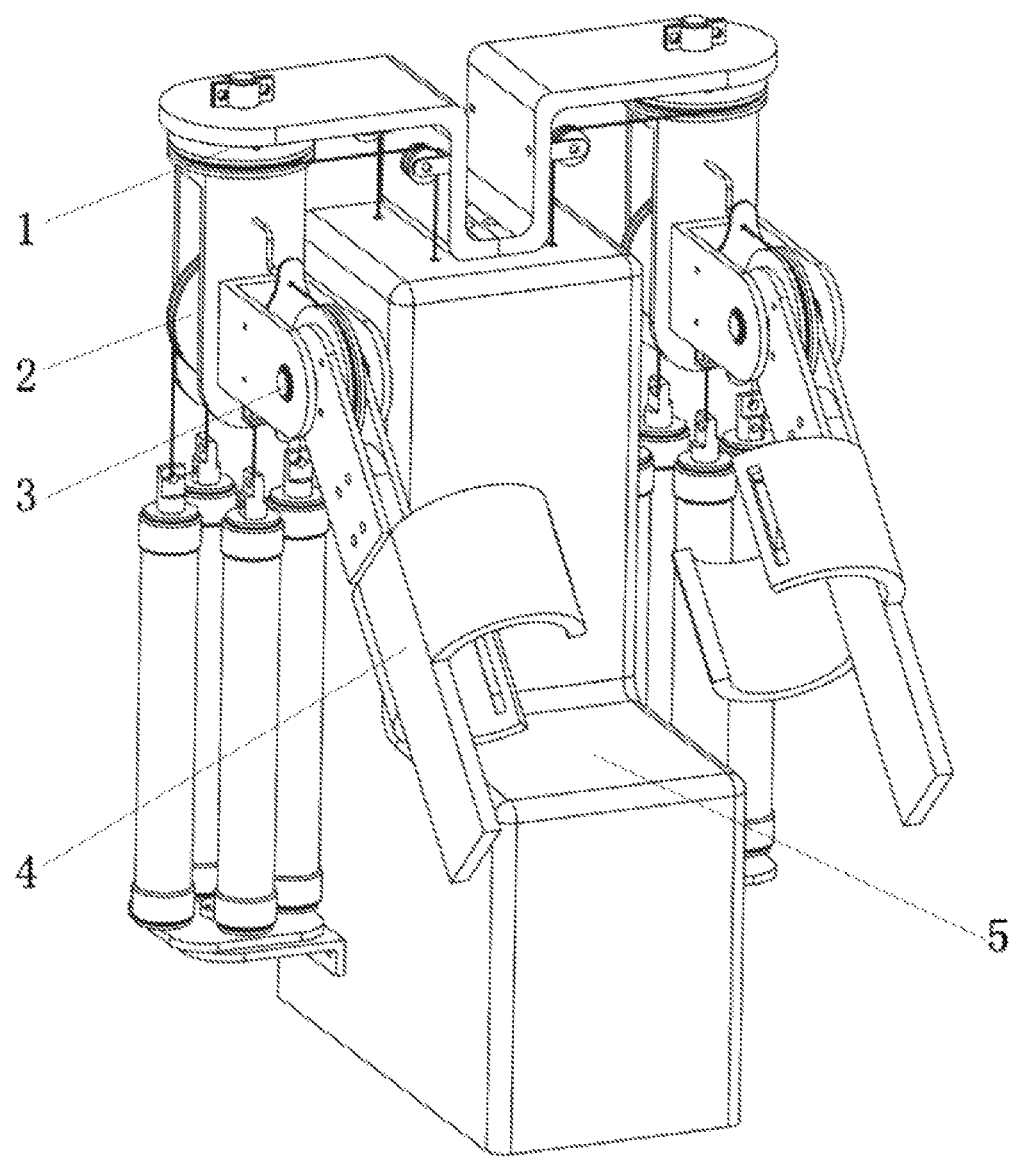
FIG. 5 is a front perspective view illustrating the overall structure of a rehabilitation training apparatus according to an embodiment of the present disclosure.
Figure 6:
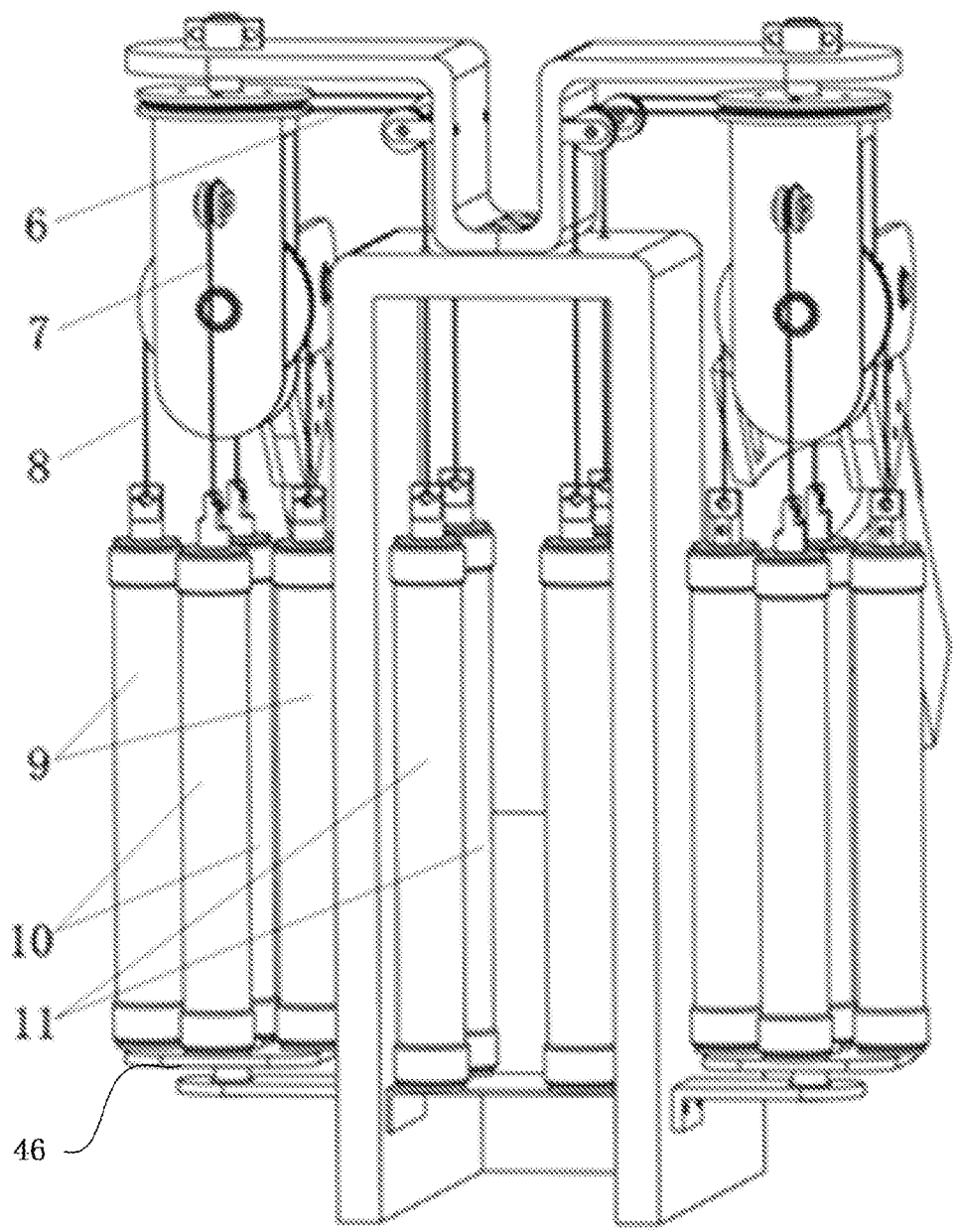
FIG. 6 is a rear perspective view illustrating the overall structure of a rehabilitation training apparatus according to an embodiment of the present disclosure.
Figure 7:
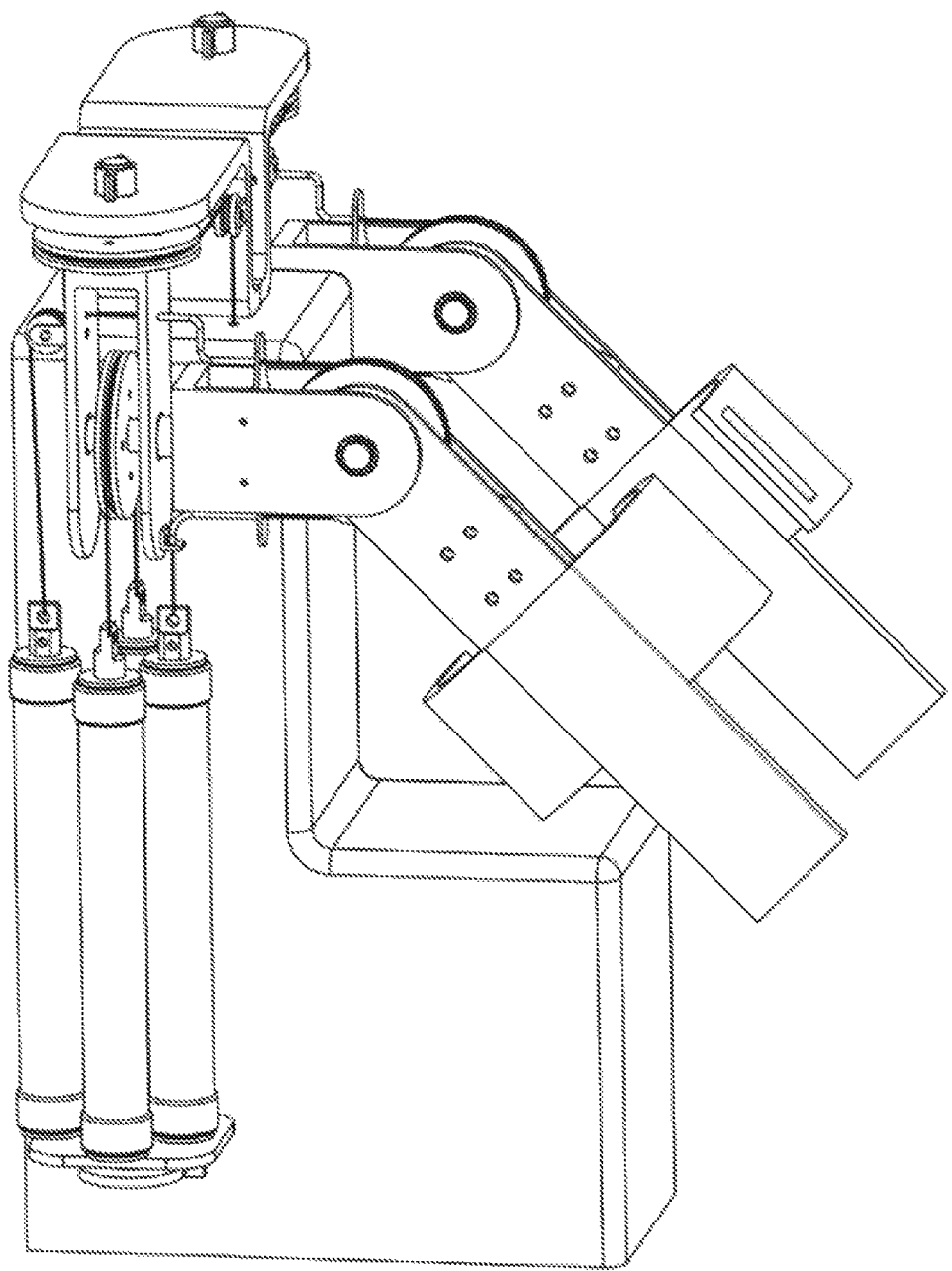
FIG. 7 is a side perspective view illustrating the overall structure of a rehabilitation training apparatus according to an embodiment of the present disclosure.

As shown in FIG. 5 and FIG. 6, when the rehabilitation training apparatus is used for rehabilitation training of a human shoulder, for example, when performing rehabilitation training on the shoulder of a patient with frozen shoulder, the rehabilitation training apparatus may be generally divided into three parts including two shoulder joint mechanisms which are left and right symmetry and a fuselage 5. Each shoulder joint mechanism is a separate three-degree-of-freedom rehabilitation training component. Each shoulder joint mechanism is composed of three sub-rotations 1, 2 and 3. Each sub-rotation is equivalent to a single-degree-of-freedom powertrain. Each of the sub-rotations 1, 2 and 3 is respectively composed of the pneumatic muscle pair 11, 9 and 10 driving the transmission wheel through the traction lines 6, 8 and 7, forming an antagonistic mechanism, completing the movement of each of the sub-rotations 1, 2 and 3. A brace plate 4 serving as the receiving portion 103 described above is mounted on the third sub-rotation 3. The traction lines 6, 8 and 7 may for example be a wire traction line, such as a steel wire traction line.

In some embodiments, the brace plate 4 may include a fixed plate and two curved portions symmetrically disposed on both sides in the width direction of the fixed plate. The brace plate 4 receives and fixes an arm of the patient with frozen shoulder. As shown in FIG. 6, the first pneumatic muscle pair 11 that drives the first sub-rotation 1 is mounted inside the fuselage 5. The second sub-rotation 2 and the third rotational pair 3 (i.e., the third rotating component) that drive the second pneumatic muscle pair 9 the third pneumatic muscle pair 10 are mounted on a rotating support table 46 on both sides of the fuselage 5, and may be freely rotated following a rotation center of the first sub-rotation 1. The rehabilitation training apparatus provided by the embodiment may generally perform the forward/backward flexion, abduction/adduction, internal/external rotation, and a combined motion of these three motions of the shoulder joint.

As shown in FIG. 5-FIG. 8, in an embodiment, the first sub-rotation 1 includes a first bracket 12, a clamp 15, a first sub-rotation bearing 16, a first transmission shaft 17, a transmission key 18, a first rotating component 20, and a second bracket 29. The first transmission shaft 17 connects the first transmission wheel 20 and the second bracket 29 together by the transmission key 18. The first rotating component 20 may take various forms including, but not limited to, a transmission wheel, a gear, etc. Hereinafter, an embodiment of the first sub-rotation 1 will be described taking the first rotating component 20 as a transmission wheel (hereinafter referred to as a first transmission wheel 20) as an example.

In some embodiments, a boss is configured at an end of the first transmission shaft 17. The boss is positioned on the inner surface of the bracket 29 to achieve a stable and secure fixation therebetween.

In some embodiments, a stop component may be configured between the first transmission wheel 20 and the first bracket 12 to prevent sway of the former relative to the latter. The stop component may take a variety of forms including, but not limited to, a pin, a stop, a sleeve.

As shown in FIG. 8, the stop component may be realized as a stop sleeve 19, one side of which fits the upper surface of the first transmission wheel 20, and the other side of which fits the lower surface of the first bracket 12, so as to prevent the first transmission wheel 20 from falling up and down. The first sub-rotation bearing 16 is mounted in a stepped transmission shaft assembly hole 121, so that the first transmission shaft 17 may be freely rotated along the center line of the assembly hole. The clamp 15 catches the first transmission shaft 17 on the upper surface of the first bracket 12, and is fastened by a bolt. The traction line 6 wrapped on the first transmission wheel 20 is connected to the first pneumatic muscle pair 11 fixed on the support table 14 by a guide pulley mechanism 13, by which the vertical orientation of the first pneumatic muscle pair 11 is achieved, thereby facilitating the installation of the first pneumatic muscle pair 11 with sufficient length, and allowing the entire apparatus to develop into the air, reducing the footprint. The antagonistic movement of the first pneumatic muscle pair 11 in the vertical direction is converted, through the guide pulley mechanism 13, into a revolving of the traction line 6 in the horizontal plane, thereby causing the first transmission wheel 20 to rotate in a corresponding plane.

As shown in FIGS. 5-7 and 9, in an embodiment, the second sub-rotation 2 includes a second bracket 29, a second sub-rotation right bearing 21, a second sub-rotation left bearing 30, a second rotating component 22, a stop sleeve 23/32, a transmission key 24/25, a second transmission shaft 31, and a third bracket 26. The second rotating component 22 may take various forms including, but not limited to, a transmission wheel, a gear, etc., Hereinafter, an embodiment of the second sub-rotation 2 will be described taking the second rotating component 22 as a transmission wheel (hereinafter referred to as a second transmission wheel 22) as an example. In this case, the second transmission shaft 31 is fixedly coupled to the second transmission wheel 22 via the transmission key 24. The second transmission shaft 31 is mounted on the second bracket 29. The second sub-rotation left bearing 30 and the second sub-rotation right bearing 21 are respectively installed in left and right assembly holes 310, which facilitate the rotation of the stepped transmission shaft 31 along the center line of the assembly hole.

Figure 11:
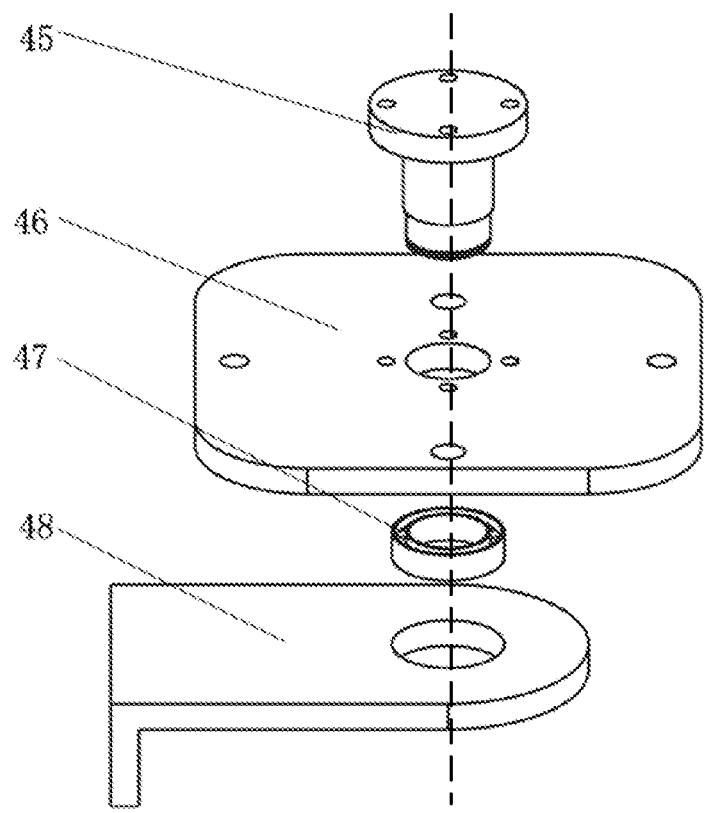
FIG. 11 is a schematic exploded view of a rotating support table of a pneumatic muscle of a rehabilitation training apparatus according to an embodiment of the present disclosure.

In some embodiments, a stop component is configured between the second bracket 29 and the second transmission wheel 22 to prevent sway of the latter relative to the former. The form of the stop component is exemplified when describing the first sub-rotation 1, which is not repeated herein. As an example of the stop component, the left side of the stop sleeve 23 is attached to the right outer surface of the second bracket 29, and the other side is attached to the left surface of the second transmission wheel 22, so as to position the left side of the second transmission wheel 22. In some embodiments, the right side of the second transmission wheel 22 is positioned by a step on the second transmission shaft 31 to further prevent the second transmission wheel 22 from moving left and right. The second transmission shaft 31 is connected to the third bracket 26 via the transmission key 25. A boss is configured at a right end of the second transmission shaft 31. The boss abuts against the inner surface of the third bracket 26, so as to securely engage the third bracket 26. In some embodiments, a stop component, such as a stop sleeve 32, may be configured between the second bracket 29 and the third bracket 26 to position the third bracket 26. In some embodiments, a bearing retaining ring groove is formed at the end of the second transmission shaft 31 for mounting a bearing retaining ring to prevent the second transmission shaft 31 from moving left and right. The traction line 8 wrapped on the second transmission wheel 22 is directly connected to the second pneumatic muscle pair 9. As described in the above embodiments, the second transmission wheel 22 and the traction wire 8 may be used together as the second conversion component. The second conversion component may also be constituted, for example, by a gear and a rack. As such, specific composition of the second conversion component described here is an exemplary example. As shown in FIGS. 6 and 11, the second pneumatic muscle pair 9 and the third pneumatic muscle pair 10 are fixed in a vertical manner on the rotating support table 46. In this way, the antagonistic movement of the second pneumatic muscle pair 9 in the vertical direction drives the second transmission wheel 22 to rotate via the traction line 8, thereby driving the third bracket 26 to rotate together.

As shown in FIGS. 5-7, 9 and 10, in an embodiment, the third sub-rotation 3 includes a third bracket 26, a first flexible sleeve 27, a second flexible sleeve 34, a third transmission shaft 35, a transmission key 41, a bearing 36/42, a third rotating component 43, a first connecting plate 39, and a second connecting plate 44. The third rotating component 43 may take various forms including, but not limited to, a transmission wheel, a gear, etc. The first connecting plate 39 and the second connecting plate 44 may take different forms depending on different applications. For a rehabilitation training apparatus for the shoulder, the first connecting plate 39 and the second connecting plate 44 may be used as a boom left connecting straight plate 39 and a boom right connecting straight plate 44, respectively. Hereinafter, an embodiment of the third sub-rotation 3 will be described when the third rotating component 43 is a transmission wheel (hereinafter referred to as the third transmission wheel 43), and the first connecting plate 39 and the second connecting plate 44 are used as the boom left connecting straight plate 39 and the boom right connecting straight plate 44, respectively.

The stepped transmission shaft 35 may be called a third transmission shaft, which drives the third transmission wheel 43, the boom left connecting straight plate 39, and the boom right connecting straight plate 44 through the transmission key 41. The third transmission wheel 43 and the boom connecting straight plates 39/44 are fixedly connected by a bolt. A stop component, such as a fourth stop component 37 and a fifth stop component 38, is configured between the outer surface of the boom left connecting straight plate 39 and the boom right connecting straight plate 44 and the inner surface of the third bracket 26. The two stop components may take the form of, for example, a stop sleeve, to position the third transmission wheel 43 to prevent the third transmission wheel 43 from moving left and right.

In some embodiments, a bearing retaining ring groove is formed at the end of the stepped transmission shaft 35 for mounting the bearing retaining ring to prevent the stepped transmission shaft 35 from moving left and right.

In an embodiment, in order to solve a problem that the traction line 7 of the third sub-rotation 3 may be pulled when the second sub-rotation 2 rotates, a flexible guiding component is provided. The flexible guiding component is fixed to the third bracket 26 and configured to guide a coupling direction of the third pneumatic muscle pair 10 and the third transmission wheel 43 so as to cancel the disturbance caused by the rotational movement of the second sub-rotation 2 to the rotational movement of the third sub-rotation 3 (for example, the orientation and movement of the traction line 7 that drives the rotation of the third transmission wheel 43). The third transmission wheel 43 and the traction line 7 may be called the third conversion component. As previously described, the third conversion component may also be constituted, for example, by a gear and a rack. As such, the specific composition of the third conversion component indicated herein is an exemplary example.

In an embodiment, with reference to FIGS. 9 and 10, the flexible guiding component includes a flexible cannula holder 40, a first flexible sleeve 27 above, and a second flexible sleeve 34 below. The traction line 7 of the third sub-rotation 3 passes through a guiding hole of the flexible cannula holder 40, enters and passes through the first flexible sleeve 27 and the second flexible sleeve 34, and is then connected to the third pneumatic muscle pair 10, respectively. In some embodiments, the left end of the first flexible sleeve 27 is fixed in a connecting hole opened in the surface of the second bracket 29, and the right end of the first flexible sleeve 27 is fixed in an upper guiding hole of the flexible sleeve bracket 40. The left end of the second flexible sleeve 34 is mounted on a lower flexible sleeve bracket 33 on the surface of the second bracket 29, and the right end is fixed in a lower guiding hole of the flexible sleeve bracket 40.

In an embodiment, one or both of the first flexible sleeve 27 and the second flexible sleeve 34 may leave a margin between the two fixed ends. As such, the first flexible sleeve 27 and the second flexible sleeve 34 may be bent and deformed, thereby avoiding a disturbing rotary motion generated by the third sub-rotation 3 caused by pulling the traction line 7 of the third sub-rotation 3 when the second sub-rotation 2 rotates. In above, the traction line 7 passes through the first flexible sleeve 27, and then passes through the second bracket 29, and is then connected, by a guide pulley 28, to a pneumatic muscle in the third pneumatic muscle pair 10 that is away from the flexible sleeve bracket 40. In below, the traction line 7 passes through the flexible sleeve 34 and is directly connected to another pneumatic muscle in the third pneumatic muscle pair 10 that is adjacent to the flexible sleeve support 40.

The first flexible sleeve 27 and the second flexible sleeve 34 have a certain flexibility and toughness, and may be deformed under an external force. A middle part of the sleeve does not change a driving form of the internal traction line 7 as long as the two ends are fixed. As such, no matter how the middle part changes, it does not affect the driving of the internal traction line 7, because the driving of the internal traction line 7 moves in the direction of the center line of the traction line, and does not exert a force on other directions. In this way, interference and disturbance to the rotation of the third sub-rotation 3 may be avoided.

When the second sub-rotation 2 rotates, the third bracket 26 and the flexible sleeve bracket 40 rotate together under the driving of the second transmission wheel 22, because one end of the flexible sleeve 27 is fixed on the bracket 29, and the intermediate shape of the flexible sleeve 27 may be changed arbitrarily without changing the fixed positions of the both ends. The most important thing here is that exit directions of the steel traction line 7 are not changed, in which one end of the steel traction line is cut into the third transmission wheel 43 (see FIG. 10) and the other end is cut into the guide pulley 28 (see FIG. 9), without affecting other movements.

Thus, the three sub-rotations 1, 2 and 3 of the shoulder joint of the above-described embodiments of the present disclosure may be moved in parallel, which ensures that all ropes do not be interfered and loosened. At the same time, the three sub-rotations 1, 2 and 3 cooperate to simulate the shoulder movement of the human body, which has excellent biomimetic characteristics and better implements the rehabilitation training exercise of human shoulder inflammation.

In an embodiment, as shown in FIGS. 5 and 6, the second pneumatic muscle pair 9 of the second sub-rotation 2 and the third pneumatic muscle pair 10 of the third sub-rotation 3 are fixed on the rotating support table.

FIG. 11 is a schematic exploded view of a rotating support table of a pneumatic muscle of a rehabilitation training apparatus according to an embodiment of the present disclosure. As shown in FIG. 11, the rotating support table 46 is mounted on a fixing bracket 48 on the fuselage through the stepped shaft 45. A bearing 47 is mounted in the assembly hole of the fixing bracket 48 to facilitate the free rotation of the stepped shaft 45. A connecting hole is formed in the boss at the upper end of the stepped shaft 45, and is fixedly connected with the rotating support table 46 of the pneumatic muscle through a bolt. The stepped shaft 45 is positioned on the fixing bracket 48 by a step provided thereon. In some embodiments, the end of the stepped shaft 45 is provided with a bearing retaining ring groove for mounting the bearing retaining ring to prevent turbulence of the stepped shaft 45.

Those skilled in the art can understand that the description of the above embodiments is not intended to limit the present disclosure, and the various elements of the embodiments may be combined with each other.

Figure 13:
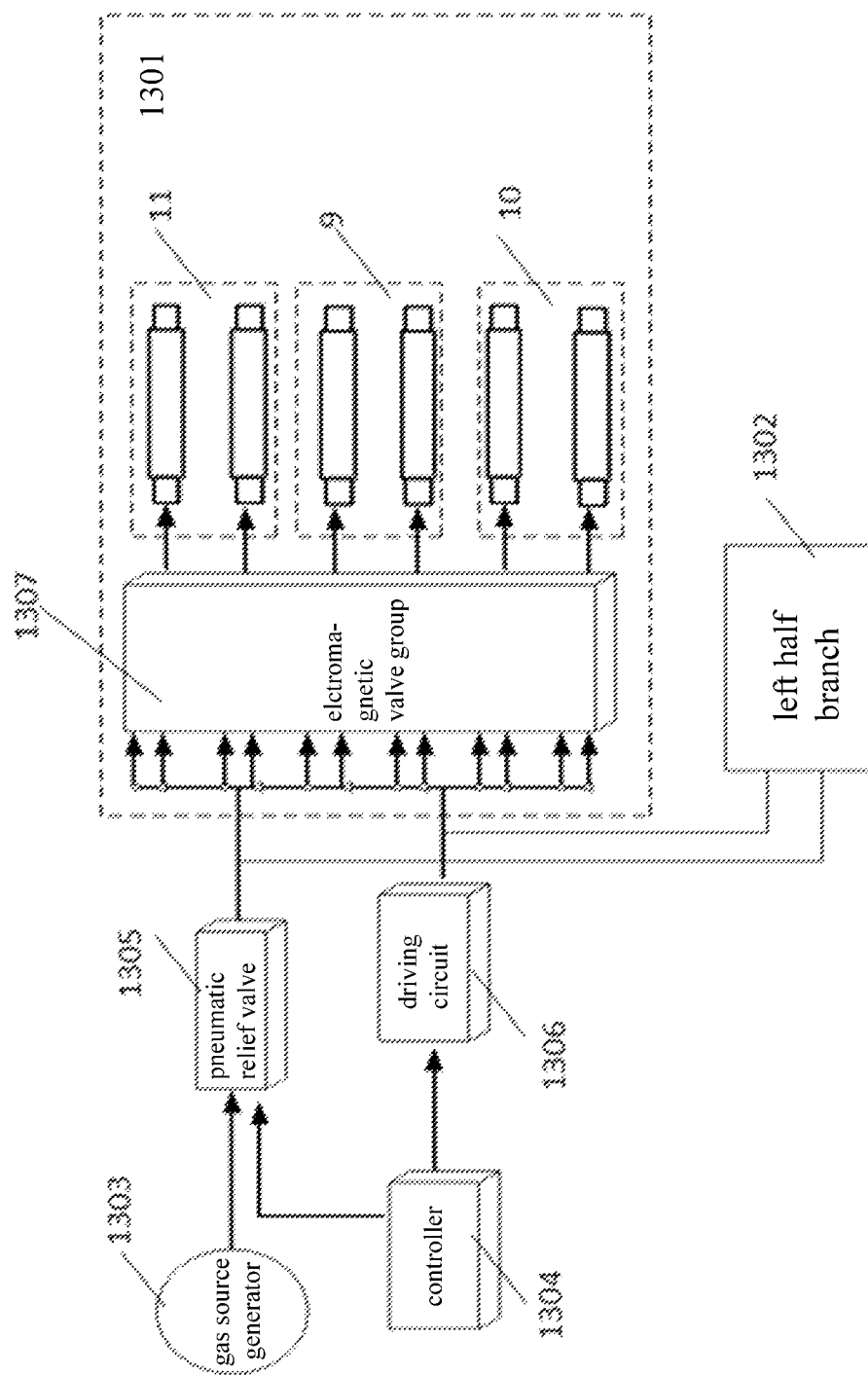
FIG. 13 is a schematic diagram of a rehabilitation training system according to an embodiment of the present disclosure.

In embodiments described below, a rehabilitation training system is provided. As shown in FIG. 13, the rehabilitation training system includes: the rehabilitation training apparatus according to any one or more of the above embodiments, a gas source, a driving circuit, an electromagnetic valve group, and a controller. The gas source guides the gas to a connector of the electromagnetic valve group through a gas pipe. A signal input end of the electromagnetic valve group is connected to the driving circuit, and an output end of the electromagnetic valve group is connected to the pneumatic flexible actuator. The electromagnetic valve group is configured to inflate and deflate the pneumatic flexible actuator under the control of the driving circuit. The controller is connected to the driving circuit to output a control command. The driving circuit is configured to control the electromagnetic valve group to perform an inflating or deflating operation according to the received control command. The rehabilitation training system has better flexibility and safety, low cost, and simple control due to the use of the rehabilitation training apparatus with the pneumatic flexible actuator.

In embodiments of the present disclosure, the controller may employ a circuit device having a logic operation execution capability such as a central processing unit (CPU), a Microcontroller Unit (MCU), a Field-Programmable Gate Array (FPGA), an application specific integrated circuit (ASIC), or the like.

Taking a rehabilitation training system for the shoulders as an example, as shown in FIG. 13, the system includes a right half branch 1301 and a left half branch 1302, principles of which are the same. Hereinafter, the right half branch 1301 is taken as an example to explain the operating principle of the rehabilitation training system.

As shown in FIG. 13, firstly, a gas source generator 1303 generates a sufficient gas source, which is stored in a gas cylinder. The gas source generator 1303 may configure a highest pressure value of the gas source, automatically start and stop, and supplement the gas source. The gas source generator 1303 is placed in a fixed position indoors, so it may also be introduced from a large common gas tank source to the connector of the electromagnetic valve group through the gas pipe. The gas is taken out from the gas source generator 1303. When a pressure value of the gas is higher than a working pressure value, the maximum pressure into the pneumatic muscle may be controlled by a pneumatic relief valve 1305. The decompressed gas comes out and enters the electromagnetic valve group 1307. The gas from the electromagnetic valve group 1307 is connected to pneumatic connectors on the three pneumatic muscle pairs 11, 9, and 10 through gas pipes. The driving circuit 1306 receives the control command previously set by the controller 1304 and is connected to the signal input end of the electromagnetic valve group 1307, thereby driving the electromagnetic valve group 1307. In the electromagnetic valve group 1307, two two-position and two-way electromagnetic valves may be configured for each pneumatic muscle, so as to coordinate to control three states including inflation, deflation and maintenance of the pneumatic muscle. Alternatively, a three-position and three-way electromagnetic valve may be configured for each pneumatic muscle to individually control the three states including the inflation, deflation, and maintenance of the pneumatic muscle. For example, the right half branch 1301 is divided into the first pneumatic muscle pair 11, the second pneumatic muscle pair 9, and the third pneumatic muscle pair 10. For the first pneumatic muscle pair 11, after the controller 1304 issues an inflating instruction, a gas inlet of one of two branches of the electromagnetic valve group 1307 corresponding to the first pneumatic muscle pair 11 is opened and a gas outlet of the other branch of two branches of the electromagnetic valve group 1307 corresponding to the first pneumatic muscle pair 11 is opened. The gas in the branch of which the gas inlet is opened enters the pneumatic muscle through the gas pipe, and the gas in the branch of which the gas outlet is opened is released from the inside of the pneumatic muscle to form an antagonistic pulling-against mechanism, which drives the transmission wheel to rotate. When the first sub-rotation 1 reaches a specified angle value, the controller 1304 issues a power-off command. At this time, the two branches of the electromagnetic valve group 1307 corresponding to the first pneumatic muscle pair 11 are all closed. The gas inside the pneumatic muscle is enclosed inside the pneumatic muscle, keeping an original position is unchanged. When the controller 1304 issues a reverse command, an opening state of the gas inlet and the gas outlet of the two branches of the electromagnetic valve group 1307 corresponding to the first pneumatic muscle pair 11 is opposite to the previous time. As such, the inflation state and the deflation state of the two pneumatic muscles are also opposite to the previous time, which drives the transmission wheel to reverse. The working principle of the second pneumatic muscle pair 9 and the third pneumatic muscle pair 10 is the same as that of the first pneumatic muscle pair 11. How the specific components coordinate belongs to the development scope of the application of the present disclosure, and the programming work may be specifically performed according to relevant motion design instructions.

The operation principle of the rehabilitation training system may be applied to any of the rehabilitation training apparatus of the embodiments of the present disclosure. The operation principle of the rehabilitation training system described herein is an example and does not constitute a limitation on the structure of the rehabilitation training apparatus of the embodiment.

Next, an exemplary working process of a rehabilitation training apparatus (also referred to as a frozen-shoulder rehabilitation training apparatus) using by a patient with frozen shoulder is described.

When using the frozen-shoulder rehabilitation training apparatus provided by the embodiment of the present disclosure, the patient sits on a seat of the fuselage 5 of the rehabilitation training apparatus. A human arm is fixed on the brace plate 4 of the apparatus through a protective bandage. Then, each pneumatic muscle is pre-inflated so that a traction line of each sub-rotation is pre-tightened at an initial position. For a pair of pneumatic muscles forming an antagonistic mechanism, in the pre-inflated state, one side is pressurized and inflated, and the other side is decompressed and deflated. As such, the traction line may drive the transmission wheel to move. For the first sub-rotation 1, as shown in FIGS. 5-8, the traction line 6 drives the first transmission wheel 20 to rotate. The first transmission wheel 20 drives the rotation through the transmission key 18 shared with the second bracket 29, thus the human arm is driven to complete the internal/external rotation of the human shoulder joint. For the second sub-rotation 2, as shown in FIGS. 5-7 and FIG. 9, the traction line 8 drives the second transmission wheel 22 to move. The second transmission wheel 22 drives the second transmission shaft 31 to rotate through the transmission key 24, and drives the third bracket 26 to rotate through the transmission key 25, thus the human arm is driven to complete the abduction/adduction movement of the human shoulder joint. During the movement of the second sub-rotation, the left ends of the flexible sleeve 27/34 are fixed at the second bracket 29, so that the third bracket 26 does not change the traction direction of the traction line 7 connected to the third pneumatic muscle pair 10 during the rotation. For the third sub-rotation pair 3, as shown in FIGS. 5-7 and 10, the traction line 7 drives the third transmission wheel 43 to rotate. The third transmission wheel 43 drives the boom left connecting straight plate 39 and the boom right connecting straight plate 44 to move through the transmission key 41. The boom left connecting straight plate 39 and the boom right connecting straight plate 44 are fixedly connected with the brace plate 4, thus the human arm is driven to complete the forward/backward flexion of the human shoulder joint. The three sub-rotations may be coordinated to move through a certain path planning, so as to implement a complex rehabilitation training process of the human shoulder joint. The left and right shoulder joints of the rehabilitation training apparatus may work simultaneously, thus the two shoulders of the patient with frozen-shoulder on both sides of the shoulder may be simultaneously trained.

The above embodiments are exemplary embodiments of the present disclosure, and are not intended to limit the disclosure. The scope of the present disclosure is defined by the claims. A person skilled in the art can make various modifications or equivalents to the present disclosure within the spirit and scope of the present disclosure, and such modifications or equivalents are also considered to be within the scope of the present disclosure.

The invention claimed is:

1. A rehabilitation training apparatus comprising at least one rehabilitation training component, wherein the rehabilitation training component comprises:
   a pneumatic flexible actuator;
   a powertrain coupled to the pneumatic flexible actuator and configured to rotate
      when driven by the pneumatic flexible actuator; and
   a receiving portion coupled to the powertrain and configured to receive a training portion and be interlocked with rotation of the powertrain;
   wherein the pneumatic flexible actuator comprises a first pneumatic muscle pair, a second pneumatic muscle pair and a third pneumatic muscle pair;
   wherein the powertrain comprises a first sub-rotation, a second sub-rotation and a third sub-rotation;
   wherein the first sub-rotation, the second sub-rotation and the third sub-rotation are independent with each other; and
   wherein the first sub-rotation, the second sub-rotation and the third sub-rotation are coupled to the receiving portion, and act on the receiving portion independently, to cause the receiving portion to be interlocked with rotation in three-degrees-of-freedom of the powertrain.

2. The apparatus of claim 1, wherein the pneumatic flexible actuator is configured to provide a stroke required for training of the training portion.

3. The apparatus of claim 1, wherein
   the first sub-rotation comprises a first bracket, a first transmission shaft, a first conversion assembly, and a second bracket, wherein:

the first bracket is configured to rotatably support the first transmission shaft;

the first conversion assembly comprises a first rotating component, and the first conversion assembly is configured to convert an antagonistic motion of the first pneumatic muscle pair into rotation of the first rotating component;

the first rotating component and the second bracket are mounted on the first transmission shaft; and the receiving portion is coupled to the second bracket and is configured to be interlocked with rotation of the second bracket.

4. The apparatus of claim 3, further comprising a fuselage; wherein the rehabilitation training apparatus comprises two rehabilitation training components, the two rehabilitation training components are symmetrically disposed on both sides of the fuselage.

5. The apparatus of claim 4, wherein the fuselage comprises a seat and a backrest.

6. The apparatus of claim 5, wherein the first pneumatic muscle pair of each of the two rehabilitation training components is positioned within the backrest.

7. The apparatus of claim 3, wherein
wherein the second sub-rotation comprises the second bracket, a second transmission shaft, a second conversion assembly, and a third bracket, wherein:
the second bracket is configured to rotatably support the second transmission shaft;
the second conversion assembly comprises a second rotating component and the second conversion assembly is configured to convert an antagonistic motion of the second pneumatic muscle pair into rotation of the second rotating component; and
the second rotating component and the third bracket are mounted on the second transmission shaft, so that the third bracket rotates with rotation of the second rotating component; and
wherein the third sub-rotation comprises the third bracket, a third transmission shaft, a third conversion assembly, a first connecting plate, and a second connecting plate, wherein:
the third bracket is configured to rotatably support the third transmission shaft;
the third conversion assembly comprises a third rotating component and the third conversion assembly is configured to convert an antagonistic motion of the third pneumatic muscle pair into rotation of the third rotating component;
the third rotating component is assembled on the third transmission shaft;
the first connecting plate and the second connecting plate are respectively positioned on two sides of the third rotating component and fixed on the third rotating component so as to be interlocked with rotation of the third rotating component; and
the receiving portion is fixed on the first connecting plate and the second connecting plate.

8. The apparatus of claim 7, wherein the first transmission shaft, the second transmission shaft, and the third transmission shaft are disposed orthogonally to each other.

9. The apparatus of claim 7, wherein the first sub-rotation further comprises a stop component, and the stop component is configured between the first rotating component and the first bracket.

10. The apparatus of claim 7, wherein the second sub-rotation further comprises a stop component, and the stop component is configured between the second rotating component and the second bracket.

11. The apparatus of claim 7, wherein a stepped portion is configured on the first transmission shaft, wherein the stepped portion is configured to receive the first rotating component on the first transmission shaft.

12. The apparatus of claim 7, wherein a stepped portion is configured on the second transmission shaft, wherein the stepped portion is configured to receive the second rotating component on the second transmission shaft.

13. The apparatus of claim 7, wherein a boss is configured at an end of the third transmission shaft adjacent to the third bracket to couple the third bracket; and
a third stop component is configured between the second bracket and the third bracket to position the third bracket.

14. The apparatus of claim 7, wherein a first stop component is configured between the first connecting plate and the third bracket, and a second stop component is configured between the second connecting plate and the third bracket to prevent axial movement of the third rotating component on the third transmission shaft.

15. The apparatus of claim 7, wherein the third sub-rotation further comprises a flexible guiding component fixed to the third bracket and configured to guide a coupling direction of the third pneumatic muscle pair and the third rotating component to cancel disturbance caused by rotation of the second sub-rotation to rotation of the third sub-rotation.

16. The apparatus of claim 15, wherein the flexible guiding component comprises a flexible cannula holder, a first flexible sleeve, and a second flexible sleeve;
wherein the flexible cannula holder is fixedly spaced to the third bracket, the first flexible sleeve and the second flexible sleeve are positioned between the flexible cannula holder and the third bracket.

17. A rehabilitation training system, comprising:
a rehabilitation training apparatus according to claim 1;
a controller, configured to output a control command;
a driving circuit, configured to receive the control command from the controller;
a gas source, fluidly connected to the rehabilitation training apparatus or the pneumatic flexible actuator of the rehabilitation training apparatus through an electromagnetic valve group; and
the electromagnetic valve group, configured to inflate and deflate the rehabilitation training apparatus or the pneumatic flexible actuator of the rehabilitation training apparatus under control of the driving circuit.

* * * * *